UNITED STATES PATENT OFFICE.

JOHN M. ORDWAY, OF JAMAICA PLAINS, MASSACHUSETTS, ASSIGNOR TO SEWELL BRACKETT, OF SAME PLACE.

IMPROVEMENT IN THE MANUFACTURE OF ARTIFICIAL STONE.

Specification forming part of Letters Patent No. 98,517, dated January 4, 1870; antedated December 18, 1869.

*To all whom it may concern:*

Be it known that I, JOHN M. ORDWAY, of Jamaica Plains, of the town of West Roxbury, of the county of Norfolk, and State of Massachusetts, have invented a new and useful Composition, which may be termed an Artificial Stone, it being useful for various purposes in the arts; and I do hereby declare the same, and the ingredients thereof, and the manner of compounding them, to be fully described as follows:

I am aware that a very alkaline silicate of soda has been used, in connection with sand, for making artificial stone, but such mixture is difficult to dry, and when merely dried, does not offer sufficient resistance to water and the influence of the atmosphere.

I use a much more silicious silicate of soda or potash, and combine the same with oxide of lead, which greatly assists the drying and the subsequent vitrification or hardening of the mass in the red heat to which I subject it.

The silicate of soda which I use contains ten parts of dry soda to twenty-five parts of silica, and sixty-five parts of water, and is prepared by any of the well-known methods in use among or known to manufacturing-chemists.

The silicate of potash, which I sometimes use in place of silicate of soda, contains twelve parts of dry potash to twenty parts of silica, and sixty-eight parts of water.

In making my said composition I mix ten parts (by weight or measure) of either of these silicates, and one part of oxide of lead, with thirty parts of fine silicious sand, and press the mixture into suitable molds. After having removed the pressed objects from the molds and dried them, I expose them for about two hours to a good red heat.

In making the said composition I do not confine it to the particular proportions of its ingredients, as above specified, but vary them somewhat, according to the use which is to be made of the stone in composition.

I sometimes add to the mixture Venetian red, amber, plumbago, or other mineral color, in sufficient quantity to impart any desired tint to it.

What I claim as my invention is—

The composition or artificial stone as above explained, consisting of silicate of soda or potash, oxide of lead, and fine silicious sand, treated substantially in manner as hereinbefore described.

JOHN M. ORDWAY.

Witnesses:
R. H. EDDY,
J. R. SNOW.